(12) United States Patent
Hasegawa et al.

(10) Patent No.: US 9,395,492 B2
(45) Date of Patent: Jul. 19, 2016

(54) OPTICAL FIBER CUTTER

(75) Inventors: Masahiro Hasegawa, Yokohama (JP);
Hiroyasu Toyooka, Yokohama (JP);
Hiroshi Nakamura, Yokohama (JP)

(73) Assignee: SEI Optifrontier Co., Ltd., Yokohama-shi, Kanagawa (JP)

( * ) Notice: Subject to any disclaimer, the term of this patent is extended or adjusted under 35 U.S.C. 154(b) by 377 days.

(21) Appl. No.: 14/004,949

(22) PCT Filed: Mar. 15, 2012

(86) PCT No.: PCT/JP2012/056758
§ 371 (c)(1),
(2), (4) Date: Sep. 13, 2013

(87) PCT Pub. No.: WO2012/124778
PCT Pub. Date: Sep. 20, 2012

(65) Prior Publication Data
US 2014/0000434 A1    Jan. 2, 2014

(30) Foreign Application Priority Data

Mar. 17, 2011    (JP) ................. 2011-059593

(51) Int. Cl.
*B26D 7/26*    (2006.01)
*B26D 3/08*    (2006.01)
*G02B 6/25*    (2006.01)

(52) U.S. Cl.
CPC .. *G02B 6/25* (2013.01); *B26D 3/08* (2013.01); *B26D 7/2635* (2013.01); *Y10S 83/955* (2013.01); *Y10T 83/0393* (2015.04); *Y10T 225/321* (2015.04)

(58) Field of Classification Search
CPC ...... Y10S 83/955; G02B 6/25; B26D 7/2635; B26D 3/08; B26D 1/18; B26D 1/185; Y10T 83/0393; Y10T 225/307–225/321
USPC ............................................. 74/816
See application file for complete search history.

(56) References Cited

U.S. PATENT DOCUMENTS

| 4,693,157 A | * | 9/1987 | Looser | B26D 1/0006 83/431 |
| 5,761,976 A | * | 6/1998 | Bailey | B26D 1/02 82/100 |
| 5,927,175 A | * | 7/1999 | Franks | B23D 21/00 225/96 |
| 6,807,886 B1 | * | 10/2004 | Rasper | B23D 21/00 407/90 |

(Continued)

FOREIGN PATENT DOCUMENTS

| CN | 1678420 | 10/2005 |
| CN | 101231366 | 7/2008 |

(Continued)

*Primary Examiner* — Stephon Choi
*Assistant Examiner* — Evan MacFarlane
(74) *Attorney, Agent, or Firm* — Drinker Biddle & Reath LLP

(57) ABSTRACT

A slider is attached to a cutter main body of an optical fiber cutter in a forward/backward movable state. A round blade member for making a scratch in an optical fiber is attached to the slider in a rotatable state. An operation lever pin for changing over rotation operation modes from one to another is attached to one end side of a pin member which penetrates a wall of the cutter main body. The rotation operation modes include a non-rotation mode for preventing the round blade member from being rotated and a continuous rotation mode for rotating the round blade member by a predetermined angle with every backward movement of the slider.

11 Claims, 17 Drawing Sheets

(56) References Cited

U.S. PATENT DOCUMENTS

| | | | | |
|---|---|---|---|---|
| 2004/0120678 A1* | 6/2004 | Hwang | ............... | G02B 6/245 385/134 |
| 2006/0201986 A1* | 9/2006 | Sasaki | ............... | B26D 3/08 225/105 |
| 2008/0178724 A1* | 7/2008 | Honma | ............... | G02B 6/25 83/887 |
| 2010/0187276 A1* | 7/2010 | Ohmura | ............... | G02B 6/25 225/2 |

FOREIGN PATENT DOCUMENTS

| | | |
|---|---|---|
| CN | 101573215 | 11/2009 |
| JP | 2001-296430 A | 10/2001 |
| JP | 2008-203815 A | 9/2008 |
| JP | 2009-003407 | 1/2009 |

* cited by examiner (a)

(b)

(a)

(b)

(a)

(b)

(a)

(b)

(a)

(b)

(a)

(b)

(a)

(b)

OPTICAL FIBER CUTTER

TECHNICAL FIELD

The present invention relates to an optical fiber cutter for cutting an optical fiber.

BACKGROUND ART

There is a known optical fiber cutter provided with a main body having a holder guide to be loaded with an optical fiber holder holding an optical fiber, a lid attached in a freely opened/closed state on a top surface of the main body, a slider arranged to slide along a linear guide fixed to the main body, and a round blade member fixed to the slider and used for making an initial scratch in the optical fiber, for example as described in Patent Literature 1.

CITATION LIST

Patent Literature

Patent Literature 1: Japanese Patent Application Laid-Open Publication No. 2001-296430

SUMMARY OF INVENTION

Technical Problem

The aforementioned conventional technology, however, has the following problem. Namely, as the round blade member is repeatedly used many times, sharpness of the round blade member becomes degraded. For this reason, it is proposed to adopt a structure in which the round blade member is attached in a rotatable state to the slider and the round blade member is rotated by a predetermined angle with degradation of sharpness of the round blade member so as to change a contact part of the round blade member with the optical fiber. However, if a worker is required to unfix the round blade member and rotate the round blade member by himself or herself, the burden on the worker will increase and it will be difficult to adequately change the contact part of the round blade member with the optical fiber, which will make it difficult to use the round blade member without waste.

It is an object of the present invention to provide an optical fiber cutter allowing the round blade member to be used without waste, while placing no burden on the worker.

Solution to Problem

An optical fiber cutter according to the present invention is an optical fiber cutter for cutting an optical fiber. The optical fiber cutter comprises a cutter main body, a slider, a round blade member, round blade rotating means, and rotation operation mode setting means. The cutter main body has a fiber guide that positions the optical fiber. The slider is attached to the cutter main body in a movable state. The round blade member is attached to the slider in a rotatable state and is arranged to make a scratch in the optical fiber. The round blade rotating means rotates the round blade member. The rotation operation mode setting means sets any one of a plurality of rotation operation modes including a first mode and a second mode. The first mode is to restrict rotation of the round blade member. The second mode is to rotate the round blade member by a predetermined angle by the round blade rotating means with every movement of the slider in one direction relative to the cutter main body.

In this optical fiber cutter of the present invention, a scratch is made in the optical fiber by the round blade member by moving the slider in the one direction relative to the cutter main body from an initial position with the optical fiber being positioned on the fiber guide of the cutter main body, and then the optical fiber is cut. At this time, when the first mode is set as the rotation operation mode by the rotation operation mode setting means, the round blade member is not rotated even with movement of the slider in the one direction relative to the cutter main body. On the other hand, when the second mode is set as the rotation operation mode by the rotation operation mode setting means, the round blade member is rotated by the predetermined angle by the round blade rotating means with every movement in the one direction of the slider relative to the cutter main body. Therefore, unless the sharpness of the round blade member is especially degraded, the rotation operation mode can be set to the first mode so as not to rotate the round blade member; if the sharpness of the round blade member is degraded, the rotation operation mode can be set to the second mode so as to rotate the round blade member by the predetermined angle. When the rotation operation mode is set to the second monde in this manner, the round blade member is rotated by the predetermined angle by simply moving the slider in the one direction relative to the cutter main body. This eliminates a need for the worker to unfix and rotate the round blade member by himself or herself, which places no burden on the worker. Since the round blade member is always rotated by the fixed angle, the round blade member can be used without waste when the worker appropriately maintains the condition of the round blade member.

In the foregoing optical fiber cutter, preferably, the plurality of rotation operation modes further include a third mode for rotating the round blade member only once by the predetermined angle by the round blade rotating means with movement of the slider in the one direction relative to the cutter main body, and thereafter automatically changing over to the first mode.

In this configuration, the third mode is set as the rotation operation mode by the rotation operation mode setting means with degradation of sharpness of the round blade member, whereby the round blade member is rotated only once by the predetermined angle to change the contact part of the round blade member with the optical fiber. In this case, since the rotation operation mode is automatically changed over to the first mode after the round blade member is rotated only once, the contact part of the round blade member is used multiple times. For this reason, if sharpness of the contact part of the round blade member becomes degraded, the third mode can be again set as the rotation operation mode by the rotation operation mode setting means. Therefore, it facilitates the worker's work and the round blade member can be used evenly at all positions. This allows sure use of the round blade member without waste, while further reducing the burden on the worker.

In the aforementioned optical fiber cutter, the rotation operation mode setting means preferably has an operation lever and a stopper. The operation lever is a lever for changing over the plurality of rotation operation modes from one to another. The operation lever is preferably a knob attached to a side face of a pin member on the side where an operation lever pin exists, for allowing easy setting of the rotation operation modes. The stopper regulates the movement of the slider in the one direction so as to restrict rotation of the round blade member by the round blade rotating means when the first mode is selected as the rotation operation mode by the operation lever.

In this case, when the first mode is selected as the rotation operation mode by the operation lever, movement of the slider is regulated by the stopper so as not to rotate the round blade member, even with movement of the slider in the one direction relative to the cutter main body. Therefore, the round blade member can be prevented from being rotated, by the simple structure.

In the foregoing, the rotation operation mode setting means preferably further has a wall provided in the cutter main body, and a pin member arranged so as to penetrate the wall. The operation lever is attached to one end side of the pin member. The stopper is provided at the other end of the pin member. A spring that biases toward the stopper is arranged in the wall. The stopper is configured to project out from the wall when the first mode is selected as the rotation operation mode by the operation lever, and to be retracted into the wall when the second mode or the third mode is selected as the rotation operation mode by the operation lever.

In this case, when the first mode is selected as the rotation operation mode, the stopper projects out from the wall and thus the stopper regulates the movement of the slider, whereby the round blade member cannot be rotated by the round blade rotating means. On the other hand, when the second mode or the third mode is selected as the rotation operation mode, the stopper is retracted into the wall and thus the stopper does not regulate the movement of the slider, whereby the round blade member can be rotated by the round blade rotating means.

In the foregoing, preferably, the stopper is equipped with a rotation release pin for forcibly changing over the rotation operation mode to the first mode when the third mode is selected as the rotation operation mode by the operation lever, and the slider is provided with a pusher to be engaged with the rotation release pin.

In this case, when the slider is moved in the one direction relative to the cutter main body with the third mode being selected as the rotation operation mode, the round blade member is rotated only once by the predetermined angle by the round blade rotating means. Thereafter, the pusher of the slider comes into contact with the rotation release pin to push the rotation release pin. Then, the operation lever operates in conjunction with the motion of the rotation release pin to forcibly change over the rotation operation mode to the first mode. The operation in the third mode is implemented by the simple structure as described above.

Preferably, the round blade rotating means has a gear arranged to rotate together with the round blade member, and a tooth rest attached to the cutter main body and arranged to be engaged with teeth of the gear.

In this case, when the slider is moved in the one direction relative to the cutter main body, the tooth rest comes into contact with the gear to rotate the gear, and in conjunction therewith the round blade member comes to rotate. Therefore, the round blade rotating means can be realized by the simple structure.

Advantageous Effect of Invention

The present invention allows use of the round blade member without waste and extension of a lifetime of the round blade member, while placing no burden on the worker.

DESCRIPTION OF EMBODIMENTS

A preferred embodiment of the optical fiber cutter according to the present invention will be described below in detail with reference to the drawings.

Figure 1:
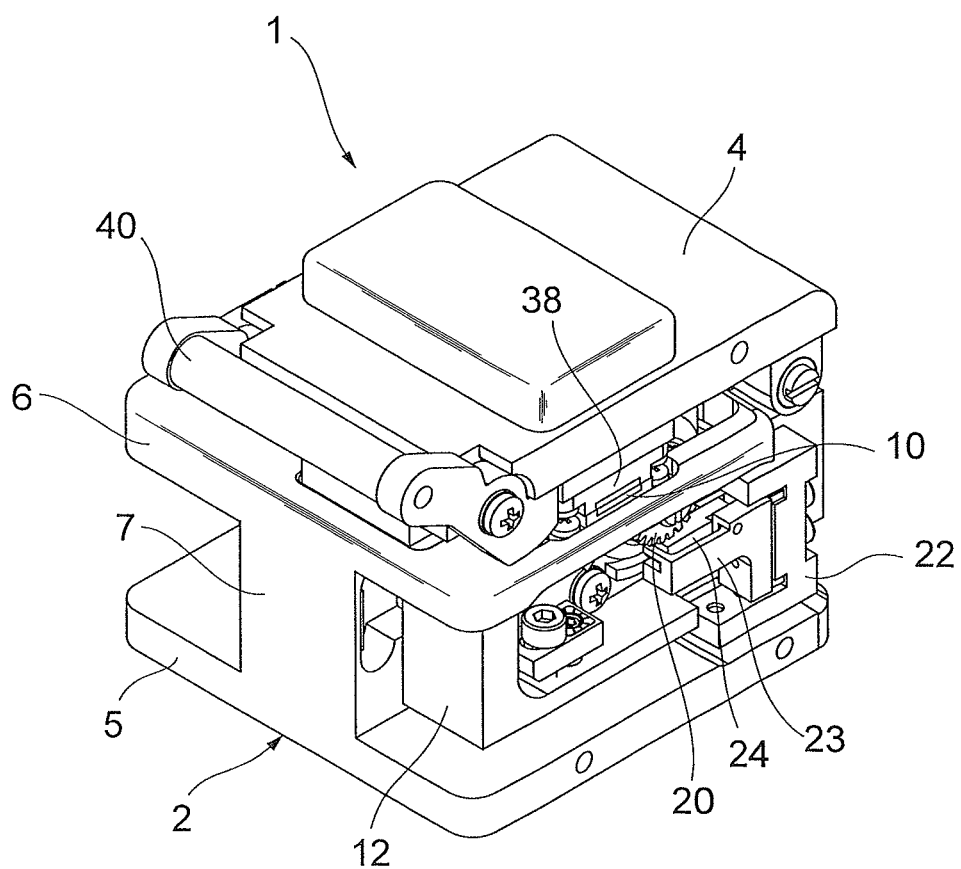
FIG. 1 is a perspective view showing an embodiment of an optical fiber cutter according to the present invention.
Figure 2:
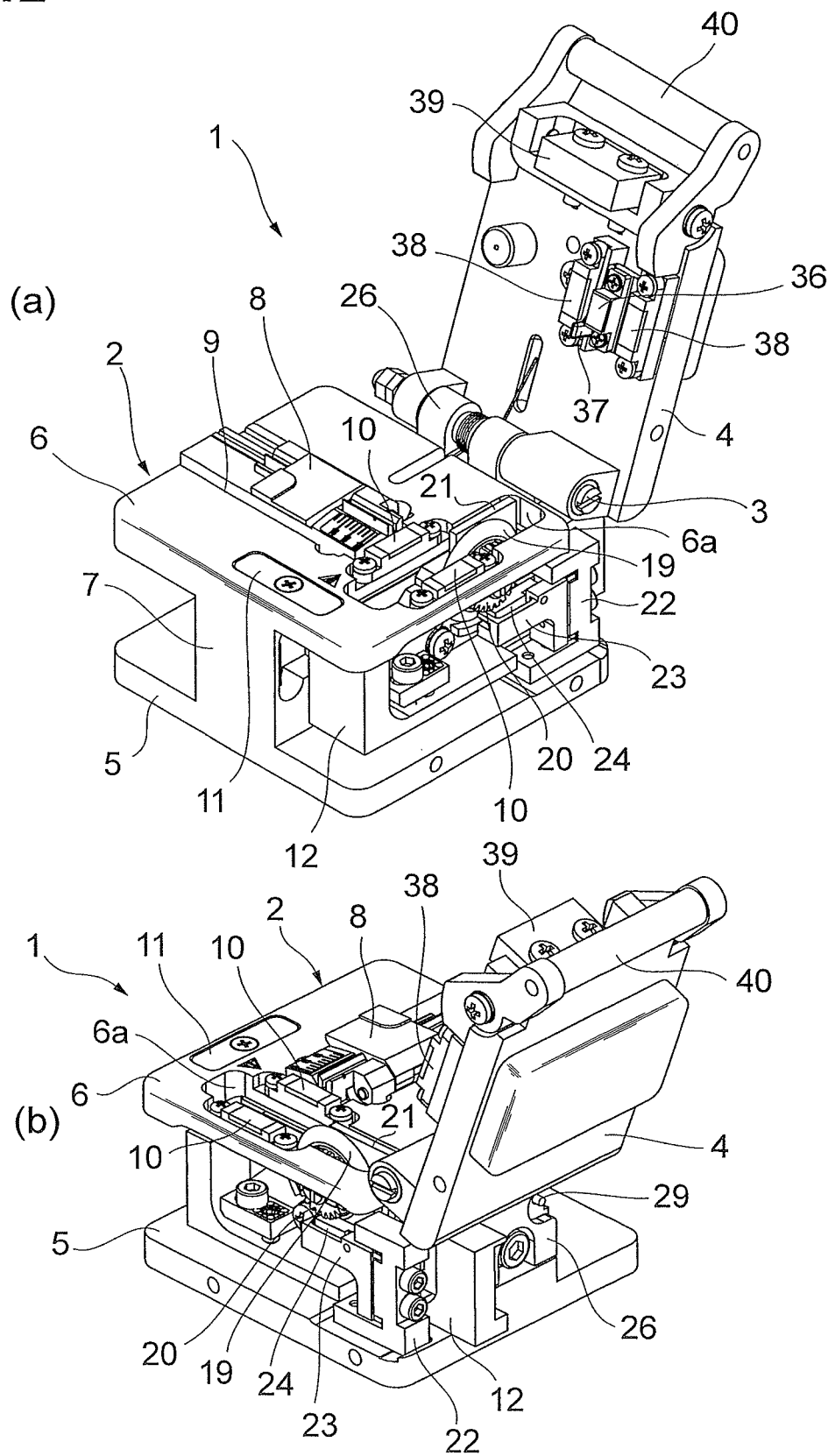
FIG. 2 is perspective views showing a state in which a lid is opened in the optical fiber cutter shown in FIG. 1.
Figure 3:
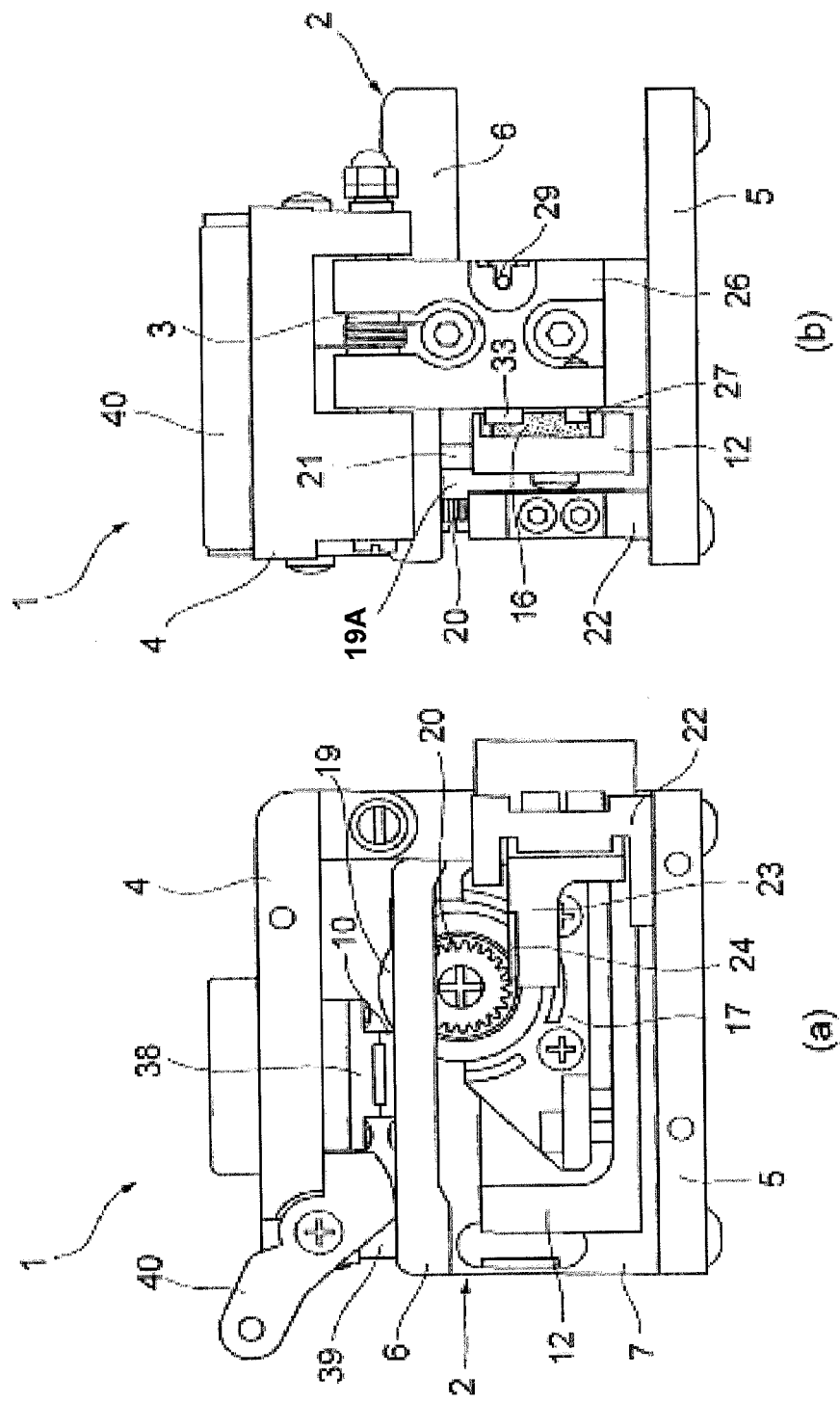
FIG. 3 is a side view and a back view of the optical fiber cutter shown in FIG. 1

FIGS. 1 and 2 are perspective views showing an embodiment of the optical fiber cutter according to the present invention. FIG. 3 is a side view and a back view of the optical fiber cutter shown in FIGS. 1 and 2. In each drawing, the optical fiber cutter 1 of the present embodiment is a device for cutting an optical fiber (not shown).

The optical fiber cutter 1 is provided with a cutter main body 2 of an approximately I-shaped cross section, and a lid 4 coupled in a freely opened/closed state through a support shaft 3 to the cutter main body 2. The cutter main body 2 has a base 5, a mount table 6 arranged above this base 5, and a connection 7 connecting the base 5 and the mount table 6.

A holder guide 9 of an approximately rectangular recess shape for positioning a fiber holder 8 holding an optical fiber to be cut is formed in a top surface of the mount table 6. An exposed hole 6a extending in a front-back direction of the cutter main body 2 (direction perpendicular to the axial direction of the optical fiber mounted on the mount table 6) is formed in a portion adjacent to the holder guide 9 in the mount table 6. A pair of rubber-attached lower clamps 10 are fixed on both sides of the exposed hole 6a to the top surface of the mount table 6. A magnet receiver 11 is provided at a front end (an end opposite to the support shaft 3) on the top surface of the mount table 6.

A slider 12 is attached to the cutter main body 2 in a forward/backward movable state. The slider 12 is arranged in a space between the base 5 and the mount table 6. A guide rail 13 of a U-shaped cross section extending in the front-back direction is attached to one side face of the connection 7 (cf. FIG. 6). A guide block 15 supported in a slidable state on the guide rail 13 is attached through a ball slide (not shown) to a back surface of the slider 12 (cf. FIG. 6). This allows the slider 12 to move in the front-back direction along the guide rail 13. An abutment 16 comprised of rubber gum, a resin material, or the like is mounted on the rear end side on the back surface of the slider 12.

A round blade installation member 17 is fixed to a front of the slider 12 by screwing with two screws. A round blade member 19 of a disk shape to make a scratch in the optical fiber is attached to the round blade installation member 17 in a rotatable state. The round blade member 19 is attached to the round blade installation member 17 so as to slightly project out upward from the aforementioned exposed hole 6a. A circular gear 20 is attached to the round blade member 19 so that the round blade member 19 and the circular gear 20 can rotate together. A projection 21 is arranged next to the round blade member 19 on the top part of the slider 12.

Figure 4:
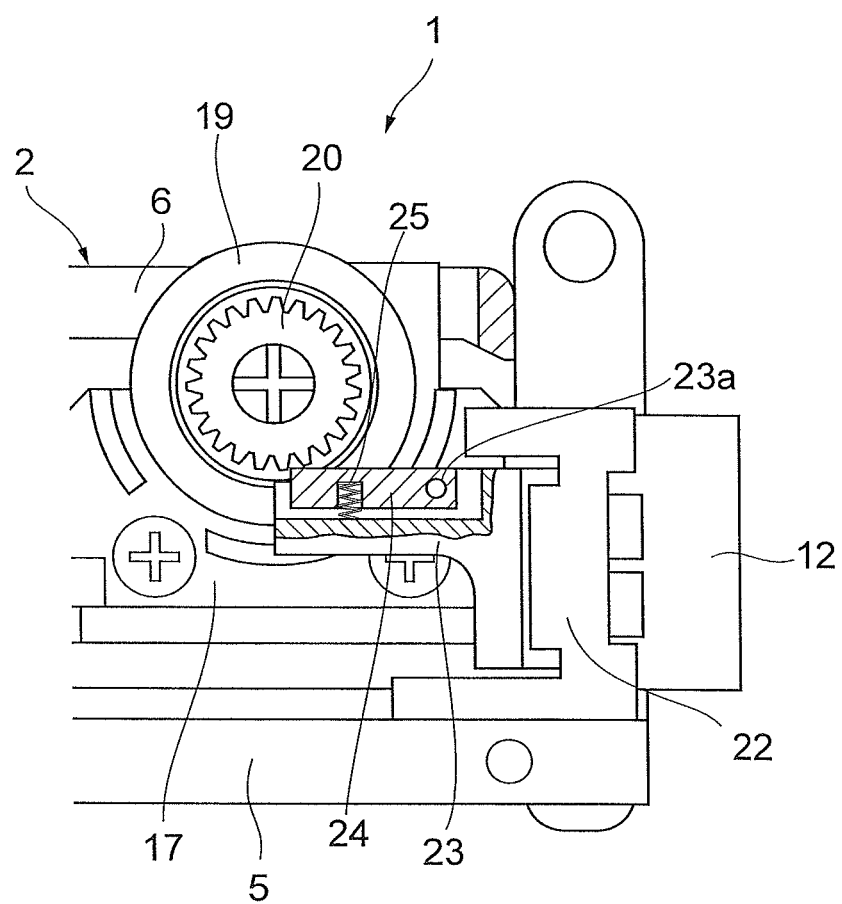
FIG. 4 is a partly enlarged side view (including a partial cross section) of the optical fiber cutter shown in FIG. 3.

A projection 22 of an approximate U-shape stands at the rear end on the slider 12 side on the base 5. An arm-shaped member 23 extending forward is fixed to this projection 22. A tooth rest 24 to be engaged with teeth of the circular gear 20 is supported in a rotatable state around a shaft 23a, as also shown in FIG. 4, on the arm-shaped member 23. A coil spring 25 for upward biasing (toward the tooth rest 24) is arranged between the arm-shaped member 23 and the tooth rest 24.

Here, for example, the circular gear 20, projection 22, arm-shaped member 23, tooth rest 24, and coil spring 25 constitute a round blade rotating means for rotating the round blade member 19.

A wall 26 being a part of the cutter main body 2 is provided at the central rear end of the base 5. The aforementioned lid 4 is coupled to an upper part of the wall 26 through the support shaft 3 in the freely opened/closed state. A stopper 27 to be engaged with the abutment 16 of the slider 12 is fixed to a lower part of a side face of the wall 26 on the slider 12 side. This stopper 27 is provided for regulating backward movement of the slider 12.

Figure 5:
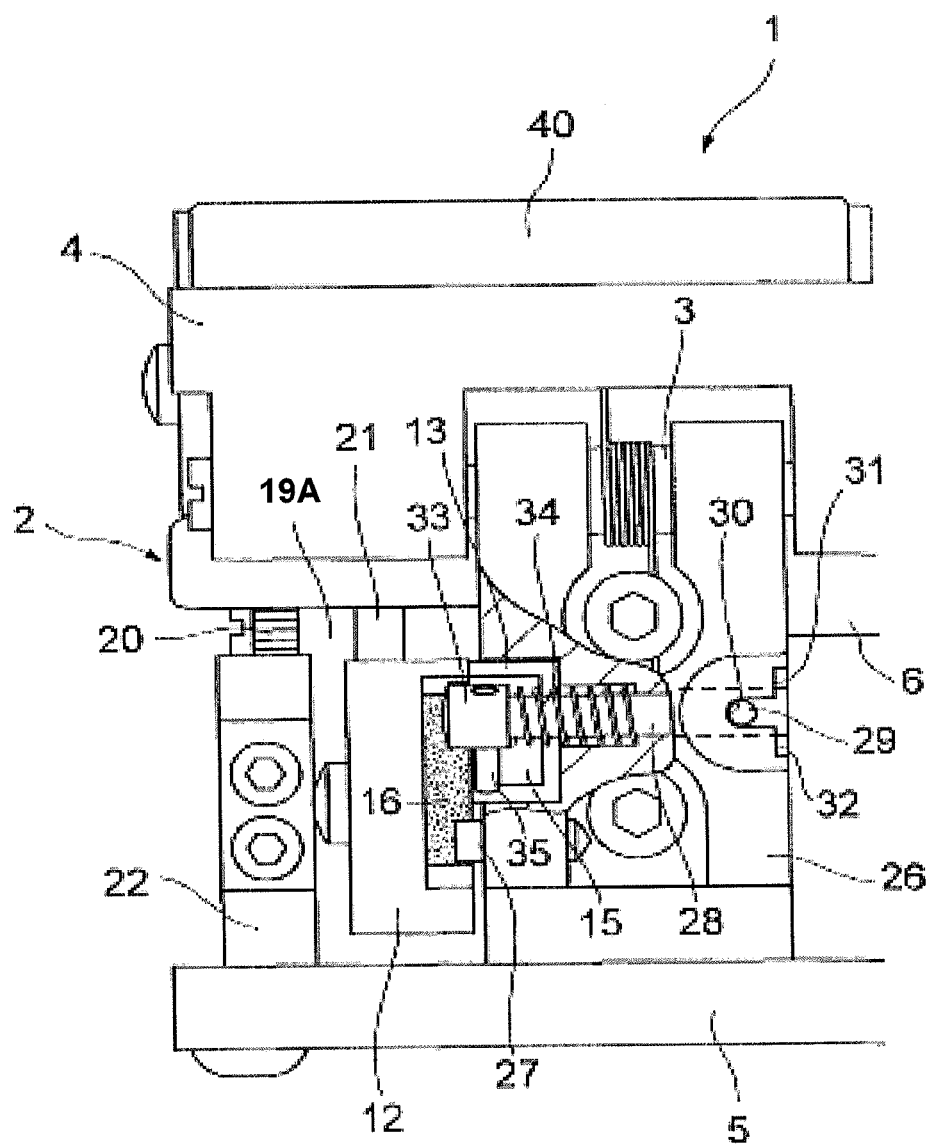
FIG. 5 is a partly enlarged back view (including a partial cross section) of the optical fiber cutter shown in FIG. 3.

A pin member 28 penetrates, as shown in FIG. 5, at a position above the stopper 27 in the wall 26. An operation lever pin 29 for changing over rotation operation modes of the round blade member 19 from one to another is attached to one end side of the pin member 28 (on the side opposite to the slider 12).

The rotation operation modes of the round blade member 19 include three modes, a non-rotation mode (first mode) of restricting rotation of the round blade member 19 so as to prevent the round blade member 19 from being rotated, a continuous rotation mode (second mode) of rotating the round blade member 19 by a predetermined angle (e.g., 15°) with every backward movement of the slider 12, and a once rotation mode (third mode) of rotating the round blade member 19 only once by the predetermined angle with backward movement of the slider 12, and thereafter automatically (or forcibly) changing over to the non-rotation mode thereby to prevent the round blade member 19 from being rotated. These rotation operation modes can be changed over from one to another by moving the operation lever pin 29 up and down while rotating the pin member 28.

A notch 30 for holding the operation lever pin 29 at a position corresponding to the non-rotation mode is formed at an end on the opposite side to the slider 12 side in the wall 26. A notch 31 for holding the operation lever pin 29 at a position corresponding to the continuous rotation mode is formed above the notch 30 in the wall 26, and a notch 32 for holding the operation lever pin 29 at a position corresponding to the once rotation mode is formed below the notch 30 in the wall 26.

A stopper 33 is provided at the other end of the pin member 28 (the end on the slider 12 side). This stopper 33 regulates backward movement of the slider 12 at a position where the aforementioned tooth rest 24 is out of contact with the circular gear 20. Namely, the stopper 33 regulates the backward movement of the slider 12 so as not to rotate the round blade member 19.

A coil spring 34 for biasing toward the stopper 33 is arranged inside the wall 26. In a normal condition, therefore, the operation lever pin 29 is set in the notch 30 by a biasing force of the coil spring 34 to bring about a state in which the rotation operation mode is set to the non-rotation mode. In this state, the stopper 33 projects out from the wall 26 on the slider 12 side.

Figure 6:
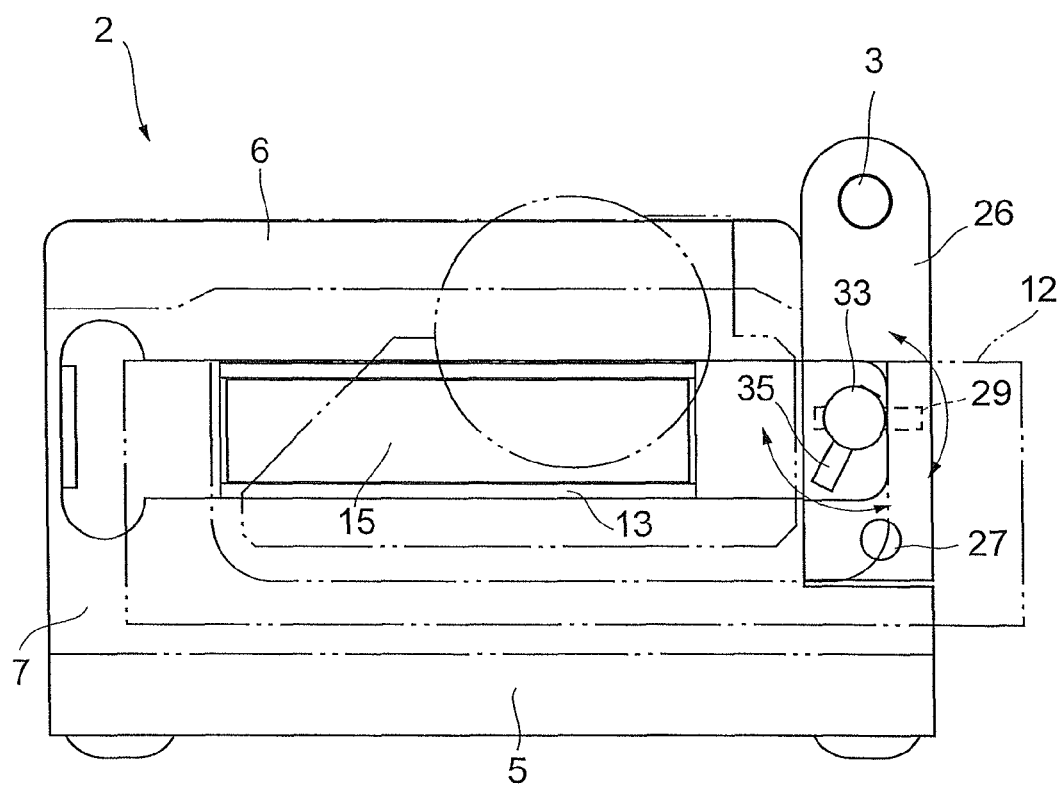
FIG. 6 is a side view of a state excluding a part of the optical fiber cutter shown in FIG. 3.

A rotation release pin 35 is attached to the stopper 33 so as to extend downward. The rotation release pin 35 is arranged to move in conjunction with the operation lever pin 29 by rotation of the pin member 28, as shown in FIG. 6. In the state in which the operation lever pin 29 is set in the notch 30 to be held at the position corresponding to the non-rotation mode, the rotation release pin 35 extends obliquely forward and downward (cf. FIG. 8). In a state in which the operation lever pin 29 is hooked in the notch 31 to be held at the position corresponding to the continuous rotation mode, the rotation release pin 35 extends right downward (in the vertical direction) (cf. FIG. 11). In a state in which the operation lever pin 29 is hooked in the notch 32 to be held at the position corresponding to the once rotation mode, the rotation release pin 35 extends more forward than in the state in which the operation lever pin 29 is held at the position corresponding to the non-rotation mode (cf. FIG. 14).

Here, for example, the wall 26, pin member 28, operation lever pin 29, notches 30-32, stopper 33, coil spring 34, and rotation release pin 35 constitute a rotation operation mode setting means for setting any one of a plurality of rotation operation modes including the first mode for preventing the round blade member 19 from being rotated, the second mode for rotating the round blade member 19 by the predetermined angle by the round blade rotating means (mentioned above) with every movement in one direction of the slider 12 relative to the cutter main body 2, and the third mode for rotating the round blade member 19 only once by the predetermined angle by the round blade rotating means with movement of the slider 12 in the one direction relative to the cutter main body 2, and thereafter automatically changing over to the first mode.

A rubber-attached block 36 to impose a bend on the optical fiber in which a scratch was made by the round blade member 19, so as to cut the optical fiber is fixed to a back surface of the lid 4. The block 36 is biased on the back surface side of the lid 4 (toward the cutter main body 2) by a coil spring (not shown). An engagement piece 37 to be engaged with the aforementioned projection 21 when the lid 4 is closed onto the cutter main body 2 is attached to the block 36.

A pair of rubber-attached upper clamps 38 are fixed on both sides of the block 36 to the back surface of the lid 4. Each upper clamp 38 operates in cooperation with the lower clamp 10 to clamp the optical fiber mounted on the mount table 6. A magnet 39 to be attracted to the aforementioned magnet receiver 11, and a handle 40 are attached to the fore end (front end) of the back surface of the lid 4.

When a cutting process of an optical fiber is carried out using the optical fiber cutter 1 as described above, the optical fiber is first set to be held on the fiber holder 8 and thereafter, in a state in which the slider 12 is located at the foremost position (initial position) relative to the cutter main body 2, the fiber holder 8 is set on the holder guide 9 provided in the mount table 6 of the cutter main body 2 with the lid 4 being opened.

Subsequently, the lid 4 is closed. Then, the optical fiber becomes nipped by each of the clamps 10, 38. Furthermore, the engagement piece 37 attached to the lid 4 comes into contact with the projection of the slider 12, whereby the block 36 is maintained against a biasing force of the spring (not shown).

Next, the slider 12 is moved backward relative to the cutter main body 2. Then, the round blade member 19 is brought into contact with the optical fiber to make a scratch in the optical fiber. As the slider 12 is further moved backward, the projection 21 passes the engagement piece 37 and therefore the block 36 moves down to hit the optical fiber because of the biasing force of the spring (not shown), thereby imposing a bend on the optical fiber. At this time, since the fore and base end sides of the optical fiber are held by the clamps 10, 38, a tension is applied to the optical fiber. As a result, the optical fiber is broken with the scratch in the optical fiber serving as a starting point.

Figure 7:
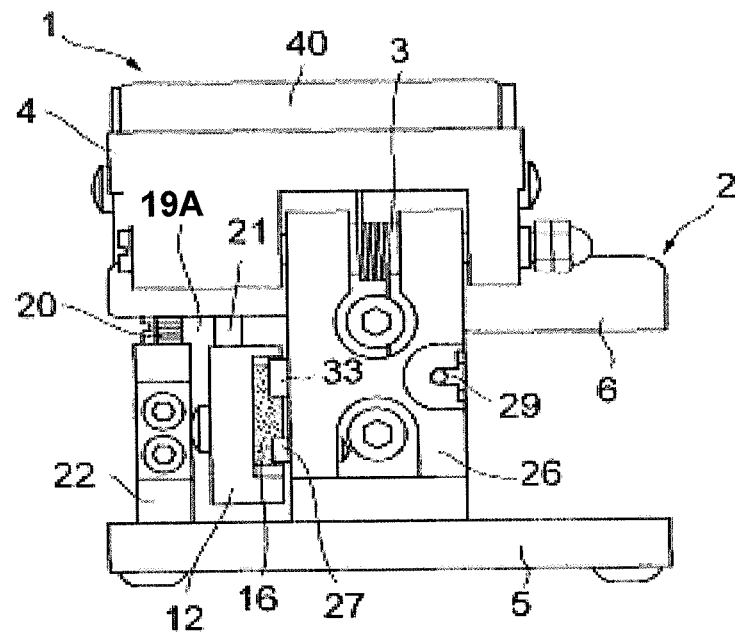
FIG. 7 is a back view and a sectional view seen from the back of the optical fiber cutter in a situation where a rotation operation mode of a round blade member is set to a non-rotation mode.
Figure 7:
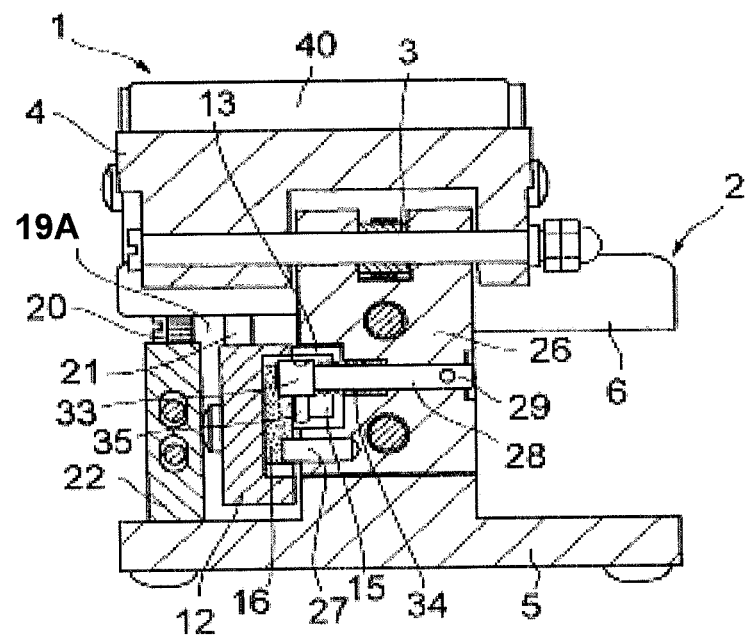
Figure 8:
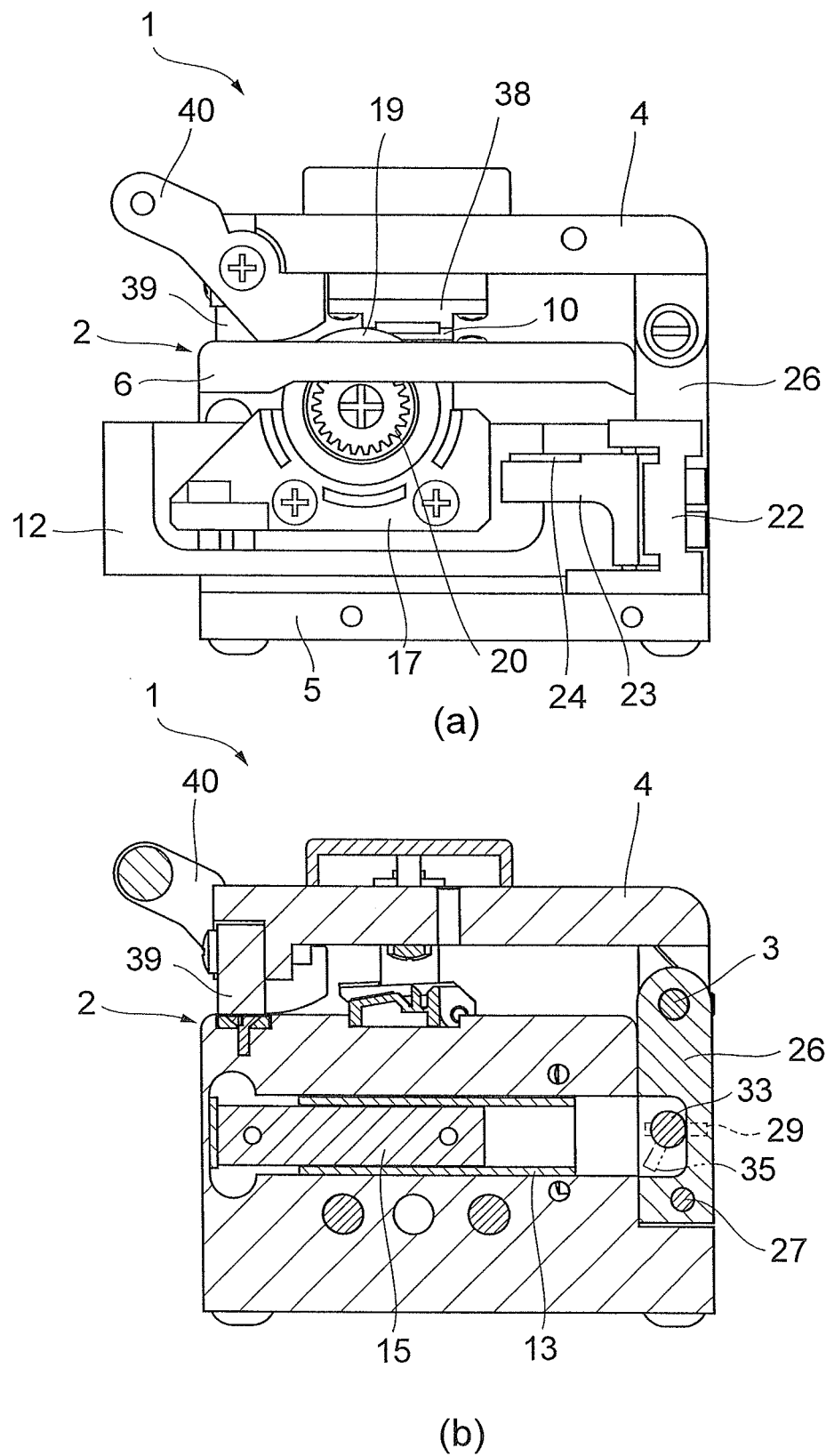
FIG. 8 is a side view and a sectional view seen from the side of the optical fiber cutter in the situation where the rotation operation mode of the round blade member is set to the non-rotation mode.
Figure 9:
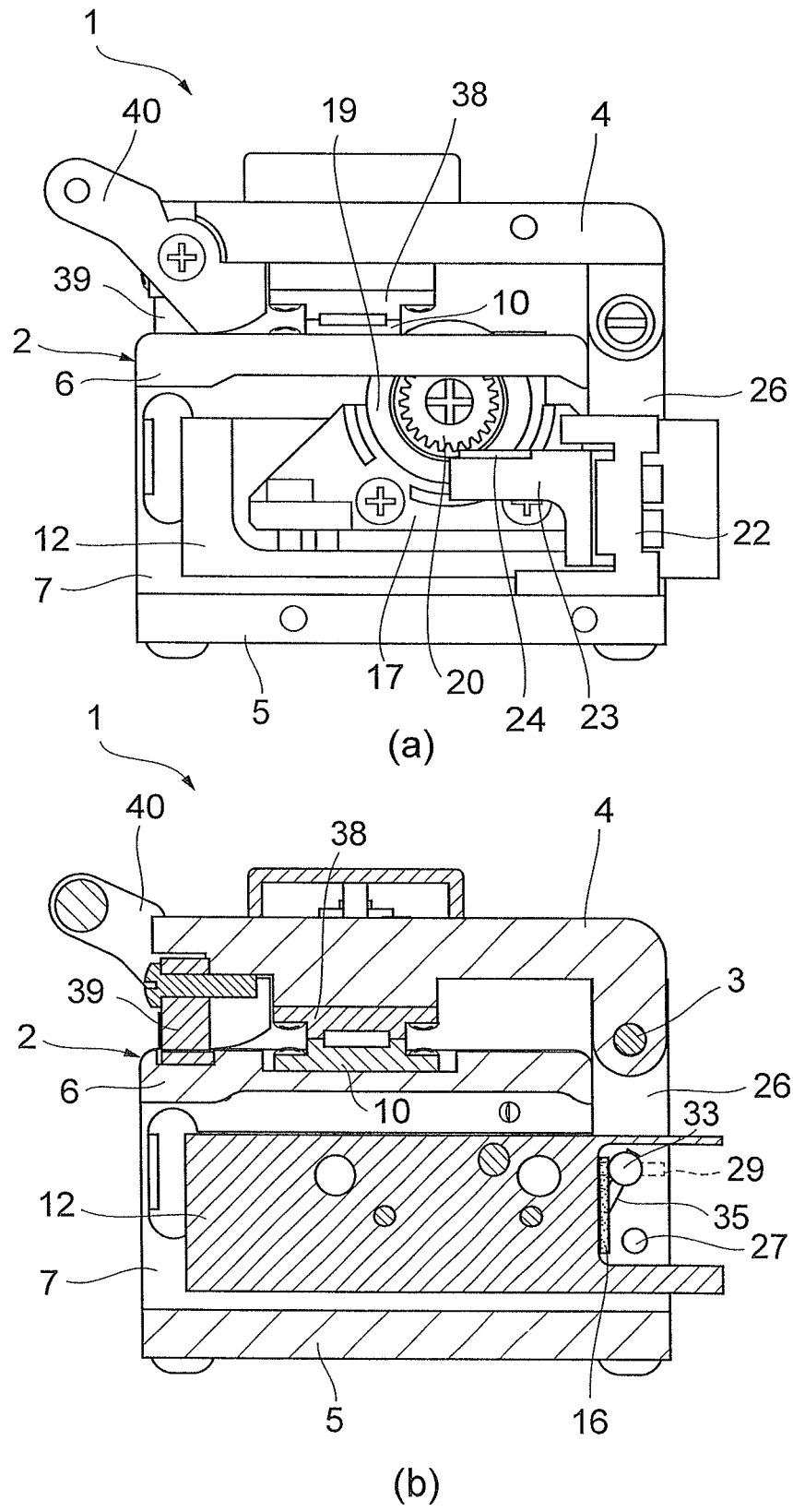
FIG. 9 is a side view and a sectional view seen from the side of the optical fiber cutter when a slider is moved backward from the state shown in FIG. 8.

Here, in the normal condition that the rotation operation mode is set to the non-rotation mode with the operation lever pin 29 being set in the notch 30, as shown in FIGS. 7 and 8, the stopper 33 is projecting out from the wall 26. In this condition, after the optical fiber is cut, the slider 12 is further moved backward to bring the abutment 16 into contact with the stopper 33, as shown in FIG. 9. For this reason, the tooth rest 24 is kept away from the circular gear 20, so as not to rotate the round blade member 19.

Thereafter, the lid 4 is opened and the slider 12 is moved back to the initial position; if the cutting process of a new optical fiber is further carried out in the same manner as above, a scratch is made in the optical fiber by the same portion of the round blade member 19 as in the preceding process.

Figure 10:
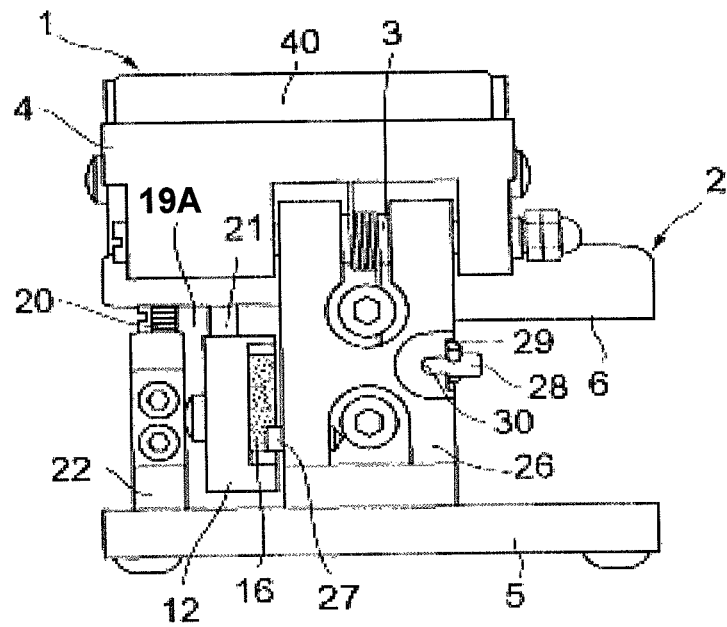
FIG. 10 is a back view and a sectional view seen from the back of the optical fiber cutter in a situation where the rotation operation mode of the round blade member is set to a continuous rotation mode.
Figure 10:
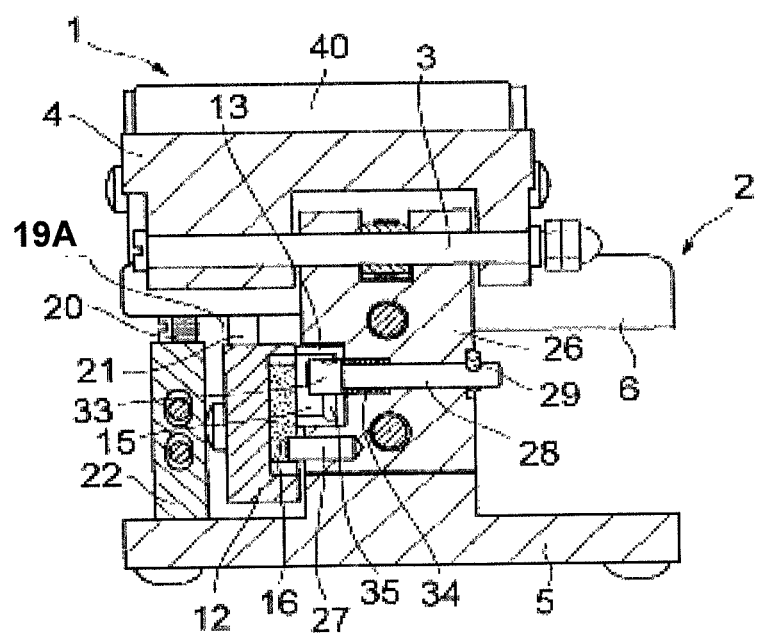
Figure 11:
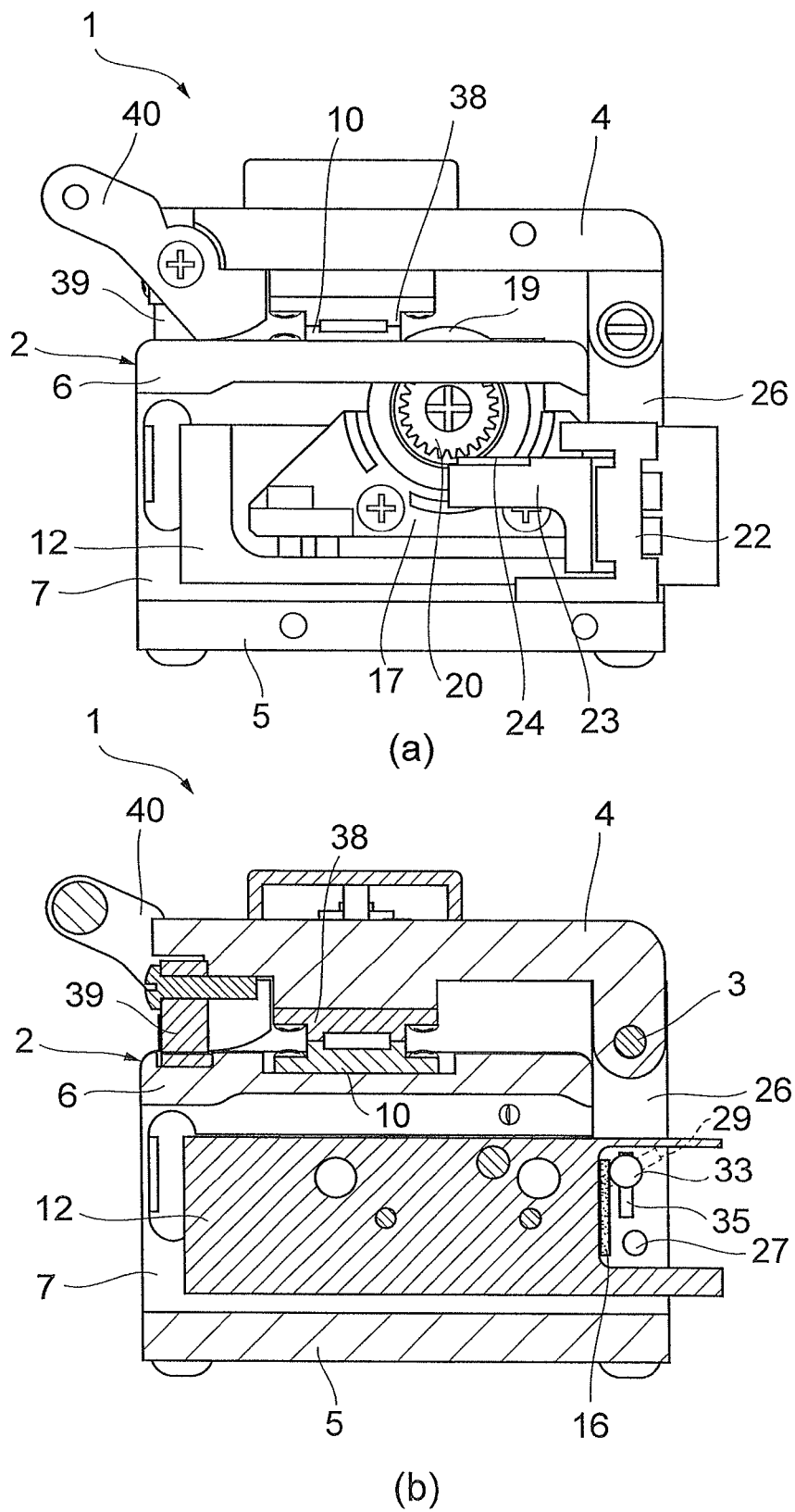
FIG. 11 is a side view and a sectional view seen from the side of the optical fiber cutter in the situation where the rotation operation mode of the round blade member is set to the continuous rotation mode.
Figure 12:
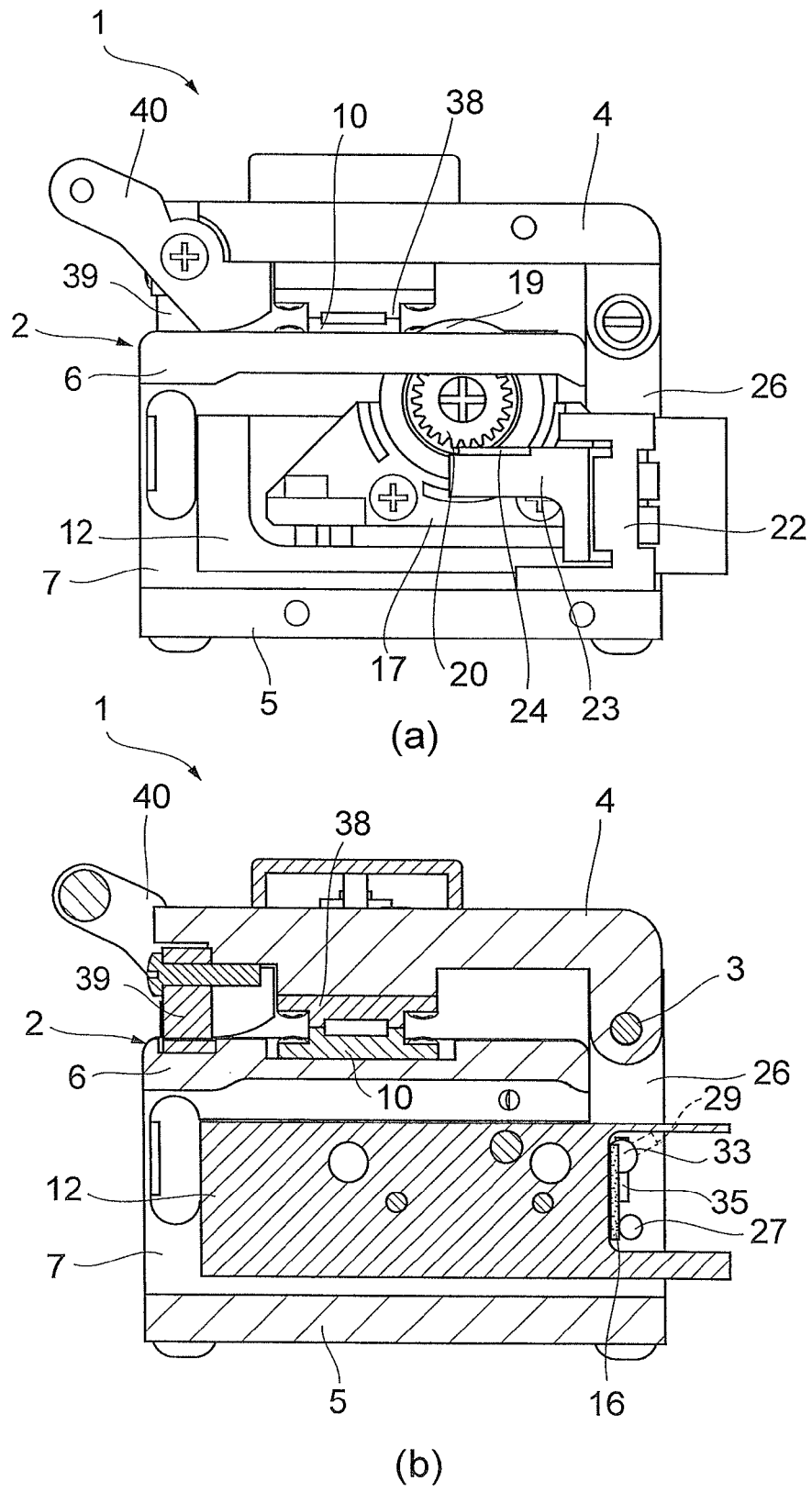
FIG. 12 is a side view and a sectional view seen from the side of the optical fiber cutter when the slider is moved backward from the state shown in FIG. 11.

On the other hand, when the operation lever pin 29 is hooked in the notch 31 against the biasing force of the coil spring 34, as shown in FIGS. 10 and 11, the rotation operation mode is set to the continuous rotation mode to bring about a state in which the stopper 33 is retracted into the inside of the wall 26. In this state, after the optical fiber is cut, the slider 12 is further moved backward to bring the tooth rest 24 into contact with the circular gear 20, whereby the teeth of the circular gear 20 come to ride on the tooth rest 24 while pushing the tooth rest 24 downward against the biasing force of the coil spring 25, so as to rotate the circular gear 20 by the predetermined angle (15°) and, in conjunction therewith, also rotate the round blade member 19 by the predetermined angle. With further backward movement of the slider 12, the abutment 16 comes into contact with the stopper 27, as shown in FIG. 12, and therefore the slider 12 is prevented from further moving backward.

Thereafter, the lid 4 is opened and the slider 12 is moved back to the initial position; if the cutting process of a new optical fiber is carried out in the same manner as above, a scratch is made in the optical fiber by a portion of the round blade member 19 shifted by the predetermined angle from that in the preceding process. At this time, since the stopper 33 is maintained in the retracted state inside the wall 26, backward movement of the slider 12 results in again rotating the round blade member 19 by the predetermined angle in the same direction.

Figure 13:
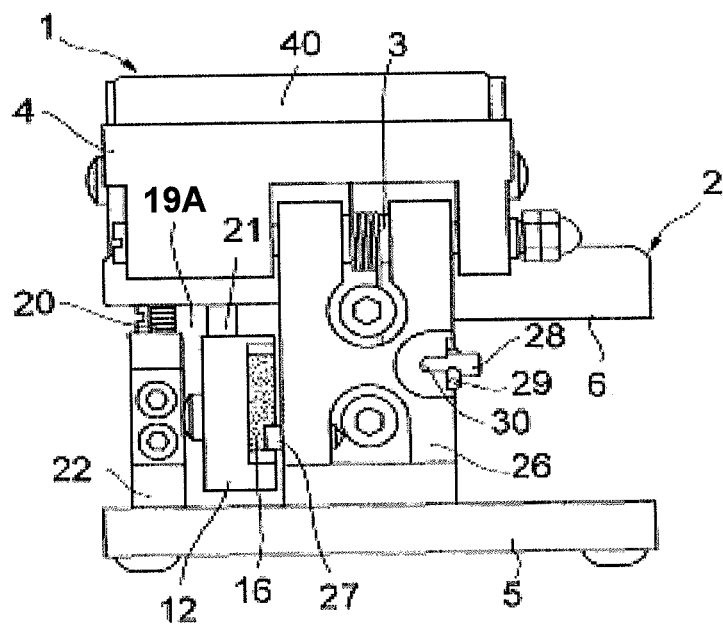
FIG. 13 is a back view and a sectional view seen from the back of the optical fiber cutter in a situation where the rotation operation mode of the round blade member is set to a once rotation mode.
Figure 13:
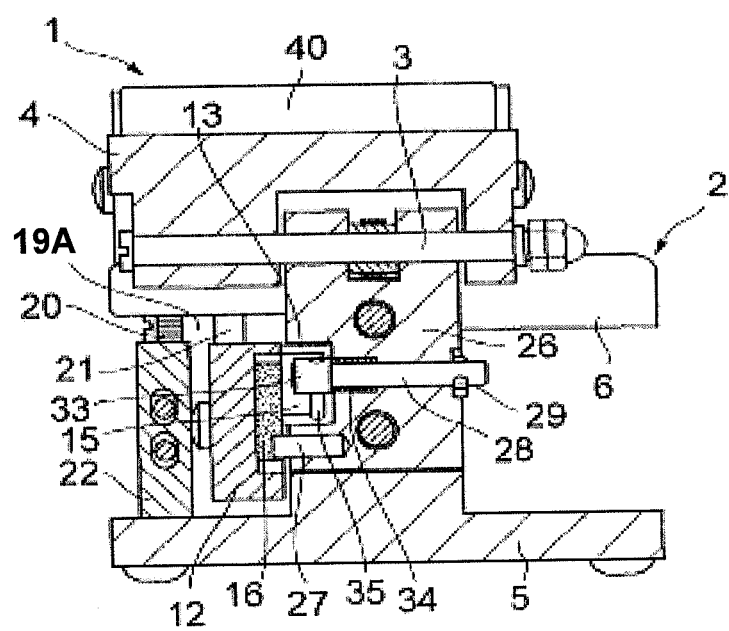
Figure 14:
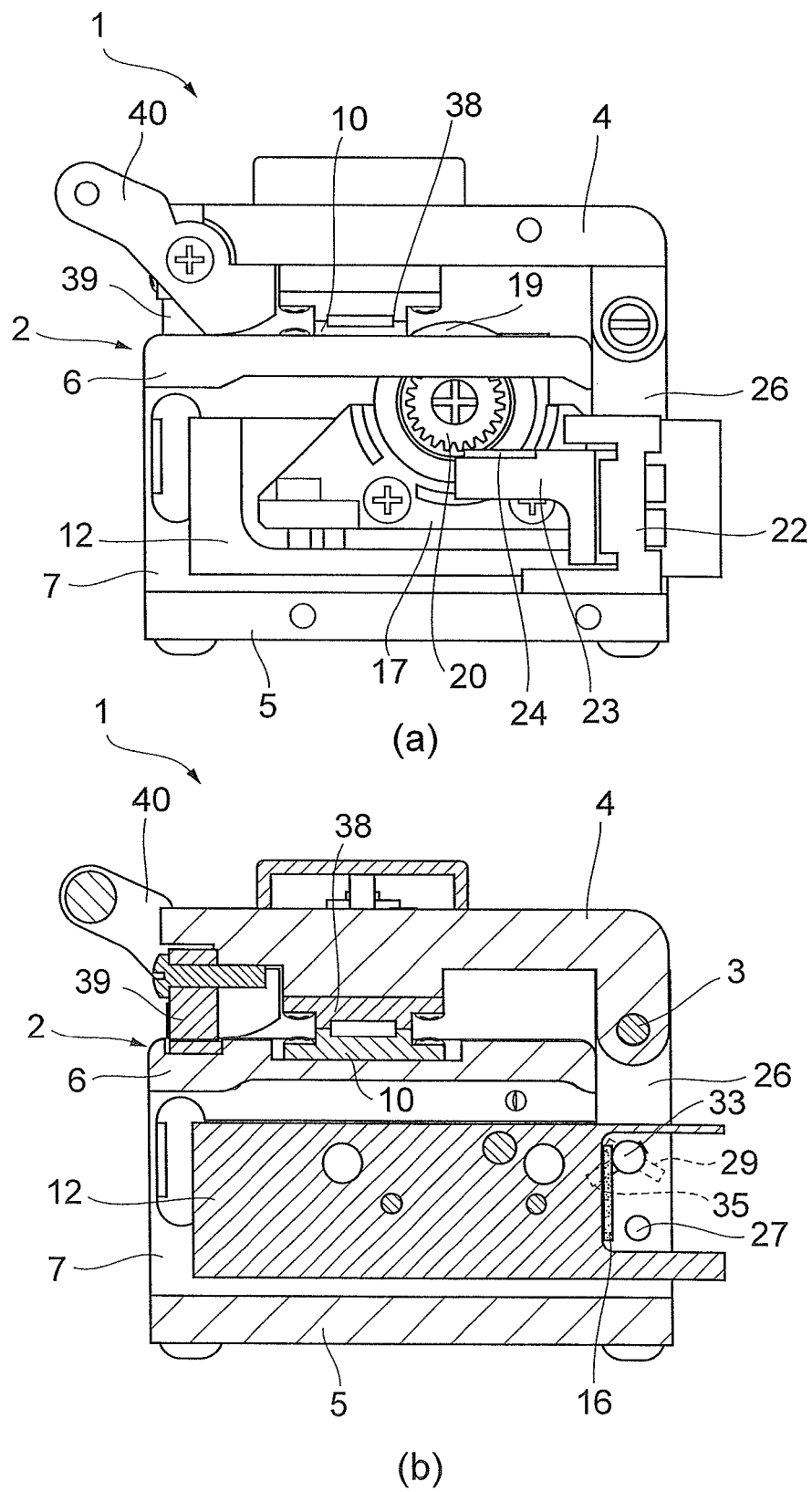
FIG. 14 is a side view and a sectional view seen from the side of the optical fiber cutter in the situation where the rotation operation mode of the round blade member is set to the once rotation mode.

Furthermore, when the operation lever pin 29 is hooked in the notch 32 against the biasing force of the coil spring 34, as shown in FIGS. 13 and 14, the rotation operation mode is set to the once rotation mode to bring about a state in which the stopper 33 is retracted into the inside of the wall 26. In this state, after the optical fiber is cut, the slider 12 is further moved backward to bring the tooth rest 24 into contact with the circular gear 20 as in the continuous rotation mode, so as to rotate the circular gear 20 by the predetermined angle and, in conjunction therewith, also rotate the round blade member 19 by the predetermined angle.

Figure 15:
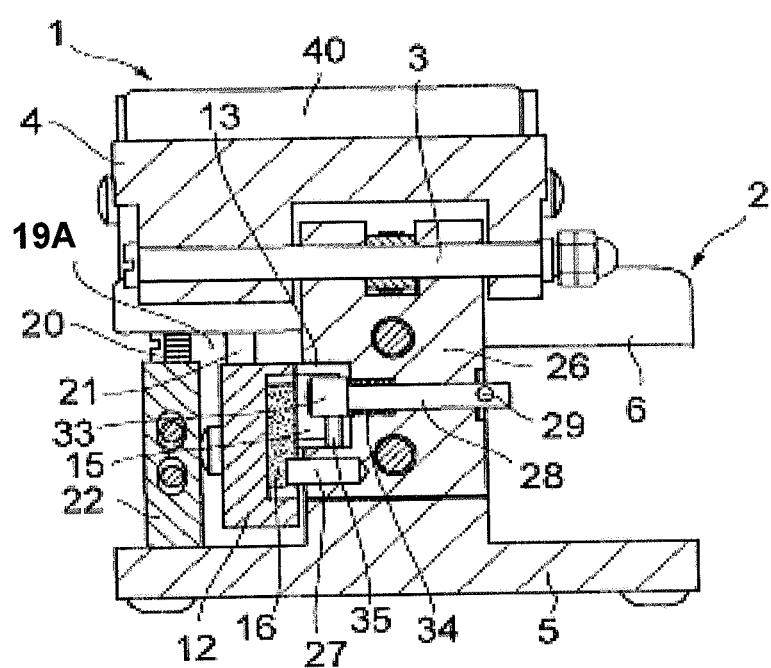
FIG. 15 is a sectional view seen from the back of the optical fiber cutter when the slider is moved backward from the state shown in FIG. 13.
Figure 16:
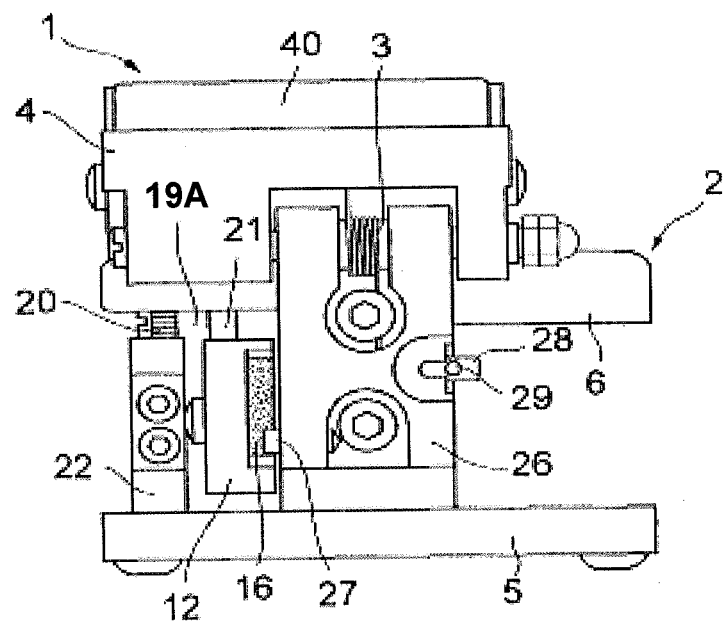
FIG. 16 is a back view of the optical fiber cutter when the slider is moved backward from the state shown in FIG. 13.
Figure 16:
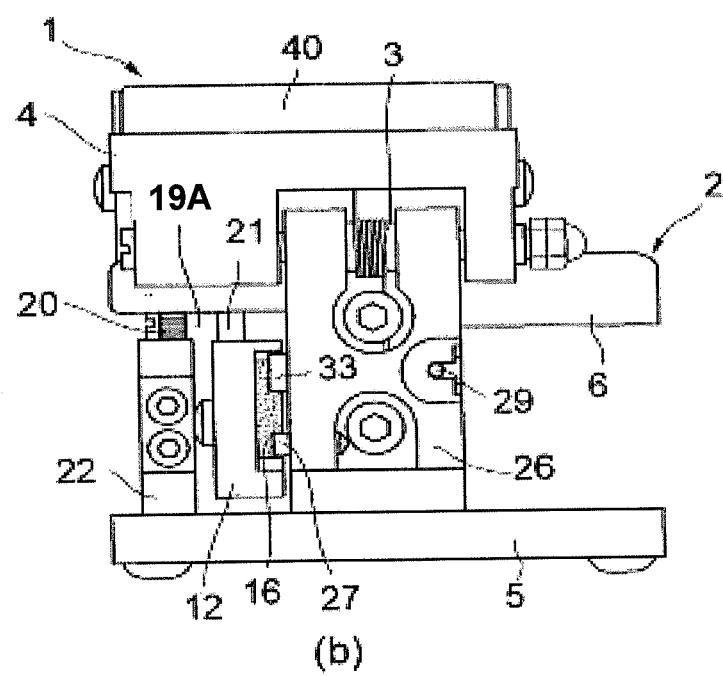

With further backward movement of the slider 12, as shown in FIG. 15, the guide block 15 comes into contact with the rotation release pin 35 to push the rotation release pin 35 backward. Then, as shown in FIG. 16, the pin member 28 is rotated whereby the operation lever pin 29 moves into the notch 30 by the biasing force of the coil spring 34 (cf. (a)→(b) of FIG. 16), to bring about the state in which the stopper 33 projects out from the wall 26. Namely, after the round blade member 19 is rotated only once by the predetermined angle, the rotation operation mode is automatically changed over from the once rotation mode to the non-rotation mode.

Thereafter, the lid 4 is opened and the slider 12 is moved back to the initial position; if the cutting process of a new optical fiber is carried out in the same manner as above, a scratch is made in the optical fiber by a portion of the round blade member 19 shifted by the predetermined angle from that in the preceding process. At this time, however, since the rotation operation mode is changed over to the non-rotation mode, further backward movement of the slider 12 results in bringing the abutment 16 into contact with the stopper 33 to prevent the round blade member 19 from being rotated.

From the above, unless the sharpness of the round blade member 19 is especially degraded, the rotation operation mode is set to the non-rotation mode by the operation lever pin 29, whereby the round blade member 19 is prevented from being rotated after cutting of the optical fiber. On the other hand, when the sharpness of the round blade member 19 is degraded, the rotation operation mode is set to the continuous rotation mode or to the once rotation mode by the operation lever pin 29, whereby the round blade member 19 is rotated by the predetermined angle after cutting of the optical fiber.

In the present embodiment, as described above, when the rotation operation mode is set to the continuous rotation mode or to the once rotation mode by the operation lever pin 29, the tooth rest 24 comes into contact with the circular gear 20 to rotate the round blade member 19 by the predetermined angle by simply moving the slider 12 backward relative to the cutter main body 2, which eliminates a need for a worker to unfix the round blade member 19 and rotate the round blade member 19 by himself or herself. This allows rotation of the round blade member 19 while placing no burden on the worker and also improves workability of maintenance.

At this time, when the rotation operation mode is set to the once rotation mode by the operation lever pin 29, the round blade member 19 is rotated only once by the predetermined angle with backward movement of the slider 12 and thereafter, the rotation operation mode is automatically changed over to the non-rotation mode so as to prevent the round blade member 19 from being rotated; therefore, the round blade member 19 is prevented from being rotated, for example, despite no degradation of sharpness of the round blade member 19. This allows us to use the round blade member 19 evenly without waste throughout the almost entire circumference, before the sharpness of the round blade member 19 becomes degraded at all positions. This enables satisfactory extension of a lifetime of the round blade member 19 and also facilitates maintenance of the round blade member 19.

When the rotation operation mode is set to the once rotation mode by the operation lever pin 29, there is no need for the worker to change over the rotation operation mode to the non-rotation mode by especially moving the operation lever pin 29 every time the round blade member 19 is rotated only once. This can further reduce the burden on the worker. Furthermore, it also becomes feasible to readily select the rotation operation mode in accordance with usage.

Figure 17:
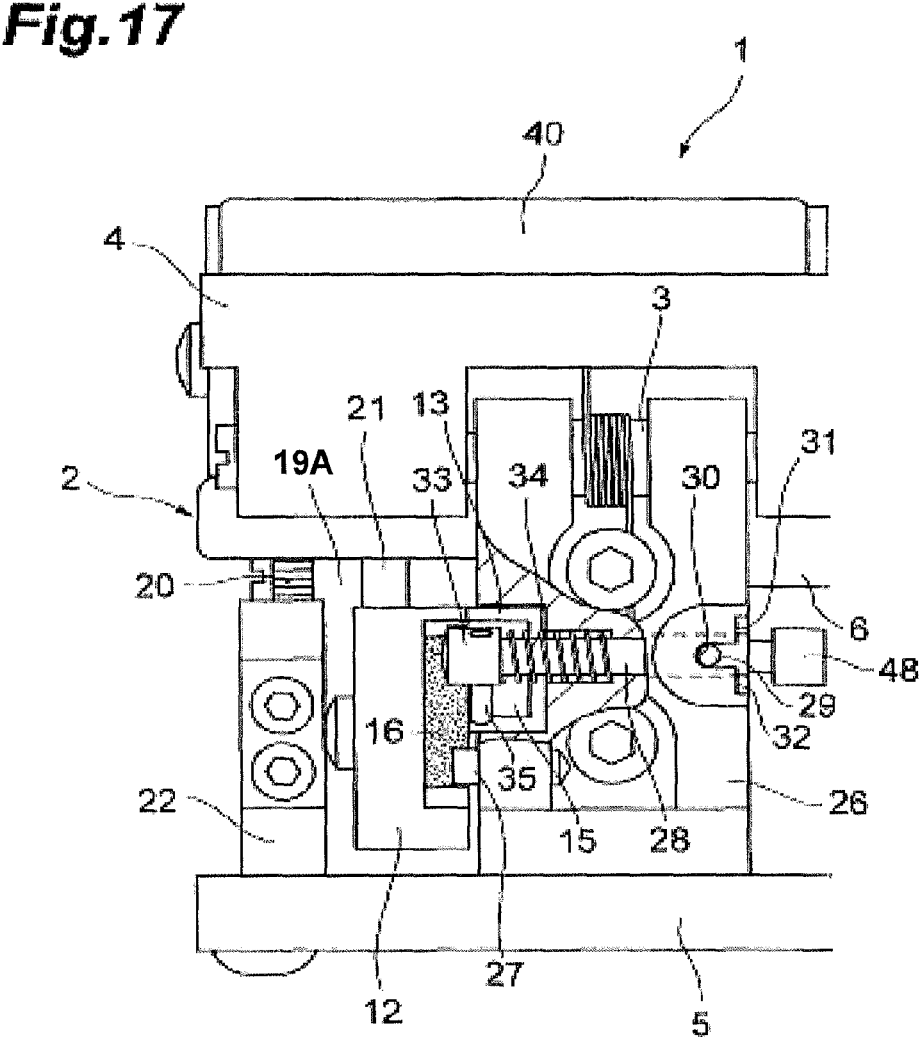
FIG. 17 is a back view showing an example in which a knob is attached to a side face of a pin member on the side where an operation lever pin exists.

The present invention is not limited to the above embodiment. For example, the above embodiment involves the three modes, the non-rotation mode, the continuous rotation mode, and the once rotation mode, as the rotation operation modes of the round blade member 19, but the once operation mode is not essential in particular. In this case, the round blade member 19 is rotated only once by the predetermined angle in the state in which the rotation operation mode is changed over from the non-rotation mode to the continuous rotation mode by the operation lever pin 29, and thereafter the rotation operation mode is changed from the continuous rotation mode back to the non-rotation mode by the operation lever pin 29. As shown in FIG. 17, the operation lever may be arranged so that a knob 48 is attached to a side face of the pin member 28 on the operation lever pin 29 side, so as to allow easy setting of the rotation operation mode. In this case, the rotation operation mode can be set easier than it is set by the operation lever pin 29.

REFERENCE SIGNS LIST

1 . . . Optical fiber cutter, 2 . . . Cutter main body, 9 . . . Holder guide (Fiber guide), 12 . . . Slider, 15 . . . Guide block (Pusher), 16 . . . Abutment, 19 . . . Round blade member, 19a . . . Location of the round blade member 19, 20 . . . Circular gear (Round blade rotating means), 22 U-shaped projection (Round blade rotating means), 23 . . . Arm-shaped member (Round blade rotating means), 24 . . . Tooth rest (Round blade rotating means), 25 . . . Coil spring (Round blade rotating means), 26 . . . Wall (Rotation operation mode setting means), 28 . . . Pin member (Rotation operation mode setting means), 29 . . . Operation lever pin (Rotation operation mode setting means), 30-32 . . . Notch (Rotation operation mode setting means), 33 . . . Stopper (Rotation operation mode setting means), 34 . . . Coil spring (Rotation operation mode setting means), 35 . . . Rotation release pin (Rotation operation mode setting means).

The invention claimed is:

1. An optical fiber cutter for cutting an optical fiber, comprising:
    a cutter main body having a fiber guide that positions the optical fiber;
    a slider attached to the cutter main body in a movable state;
    a round blade member attached to the slider in a rotatable state and arranged to make a scratch in the optical fiber;
    round blade rotating means that rotates the round blade member; and
    rotation operation mode setting means that sets any one of a plurality of rotation operation modes including a first mode of restricting rotation of the round blade member, and a second mode of rotating the round blade member by a predetermined angle by the round blade rotating means with every movement of the slider in one direction relative to the cutter main body, and
    wherein the rotation operation mode setting means comprises an operation lever for changing over the plurality of rotation operation modes from one to another, and a stopper that regulates the movement of the slider in the one direction so as to restrict rotation of the round blade member by the round blade rotating means when the first mode is selected as the rotation operation mode by the operation lever.

2. The optical fiber cutter according to claim 1, wherein the plurality of rotation operation modes further includes a third mode of rotating the round blade member only once by the predetermined angle by the round blade rotating means with movement of the slider in the one direction relative to the cutter main body, and thereafter automatically changing over to the first mode.

3. The optical fiber cutter according to claim 2, wherein the rotation operation mode setting means further comprises a wall provided in the cutter main body, and a pin member arranged so as to penetrate the wall,
    wherein the operation lever is attached to one end side of the pin member,
    wherein the stopper is provided at the other end of the pin member,
    wherein a spring that biases toward the stopper is arranged in the wall, and
    wherein the stopper is configured to project out from the wall when the first mode is selected as the rotation operation mode by the operation lever, and to be retracted into the wall when the second mode or the third mode is selected as the rotation operation mode by the operation lever.

4. The optical fiber cutter according to claim 3, wherein the stopper is equipped with a rotation release pin for forcibly changing over the rotation operation mode to the first mode when the third mode is selected as the rotation operation mode by the operation lever, and
    wherein the slider is provided with a pusher to be engaged with the rotation release pin.

5. The optical fiber cutter according to claim 1, wherein the round blade rotating means comprises a gear arranged to rotate together with the round blade member, and a tooth rest attached to the cutter main body and arranged to be engaged with teeth of the gear.

6. An optical fiber cutter for cutting an optical fiber, comprising:
    a cutter main body having a fiber guide that positions the optical fiber;
    a slider attached to the cutter main body in a movable state;
    a round blade attached to the slider in a rotatable state, the round blade configured to make a scratch in the optical fiber;
    a rotating mechanism comprising a gear and an arm that contacts the gear so as to rotate the gear, thereby rotating the round blade; and a mode setting mechanism that
- (i) sets any one of a plurality of rotation operation modes including a first mode of restricting rotation of the round blade, and a second mode of rotating the round blade by a predetermined angle by the rotating mechanism with every movement of the slider in one direction relative to the cutter main body; and
- (ii) changes the plurality of rotation operation modes from one to another, and wherein the mode setting mechanism comprises a mode selector configured to change over the plurality of rotation operation modes from one to another, and a stopper configured to regulate the movement of the slider in the one direction so as to restrict rotation of the round blade by the rotating mechanism when the first mode is selected as the rotation operation mode by the mode selector.

7. The optical fiber cutter according to claim 6, wherein the plurality of rotation operation modes further includes a third mode of rotating the round blade only once by the predetermined angle by the rotating mechanism with movement of the slider in the one direction relative to the cutter main body, and thereafter automatically changing over to the first mode.

8. The optical fiber cutter according to claim 7, wherein the mode selector is an operation lever.

9. The optical fiber cutter according to claim 8, wherein the mode setting mechanism further comprises a wall provided in the cutter main body, and a pin arranged so as to penetrate the wall, wherein the operation lever is attached to one end side of the pin, wherein the stopper is provided at the other end of the pin, wherein a spring that biases toward the stopper is arranged in the wall, and wherein the stopper is configured to project out from the wall when the first mode is selected by the operation lever, and to be retracted into the wall when the second mode or the third mode is selected by the operation lever.

10. The optical fiber cutter according to claim 9, wherein the stopper is equipped with a rotation release pin configured to forcibly change over the rotation operation mode to the first mode when the third mode is selected by the operation lever, and wherein the slider is provided with a pusher to be engaged with the rotation release pin.

11. The optical fiber cutter according to claim 6, wherein a tooth rest is attached to the cutter main body, the tooth rest configured to be engaged with teeth of the gear.

\* \* \* \* \*